United States Patent [19]

Chinnock et al.

[11] Patent Number: 5,426,427
[45] Date of Patent: Jun. 20, 1995

[54] DATA TRANSMISSION ROUTING SYSTEM

[75] Inventors: Douglas Chinnock, Tucson, Ariz.;
James Boardman, Vashon Island,
Wash.; John Goltz, Tucson, Ariz.

[73] Assignee: CompuServe Incorporated,
Columbus, Ohio

[21] Appl. No.: 680,440

[22] Filed: Apr. 4, 1991

[51] Int. Cl.⁶ ............................................. G06F 13/38
[52] U.S. Cl. .................................. 340/827; 395/200;
364/DIG. 1; 364/228.4; 364/229.1; 364/229.4;
364/284.4
[58] Field of Search ................. 364/DIG. 1 MS File;
395/200, 325, 600; 340/826, 827; 370/60, 60.1

[56] References Cited

U.S. PATENT DOCUMENTS

| | | | |
|---|---|---|---|
| 3,905,023 | 9/1975 | Perpiglia | 364/DIG. 1 |
| 4,396,984 | 8/1983 | Videki, II | 364/DIG. 1 |
| 4,466,060 | 8/1984 | Riddle | 364/DIG. 1 |
| 4,958,341 | 9/1990 | Hemmady et al. | 370/60.1 |
| 4,987,536 | 1/1991 | Humblet | 364/DIG. 1 |
| 4,999,771 | 3/1991 | Ralph et al. | 364/DIG. 1 |
| 5,088,032 | 2/1992 | Bosack | 364/DIG. 1 |
| 5,130,977 | 7/1992 | May et al. | 370/60 |
| 5,181,017 | 1/1993 | Frey, Jr. et al. | 340/827 |

OTHER PUBLICATIONS

J. Snyder, "ANSI X3S3.7 Feb., 1990" and ANSI X3S3.7 Apr., 1990, DECUScope (Jul.–Sep. 1990).
DECUS, "Call Transfer during Data Transfer Phase" Draft (Apr., 1990).
Duclos, Report on Question 7/VII, CCITT Study Group VII, Geneva (Feb. 5–16, 1990).
Enhancement of Call Deflection on Related Facilities, Delayed Contribution No. D168 from France to CCITT Study Group VII, Geneva (Feb. 5–16, 1990).

Primary Examiner—Thomas M. Heckler
Attorney, Agent, or Firm—Standley & Gilcrest

[57] ABSTRACT

A data transmission routing system which allows a terminal user to access an initial host within a computer network, the initial host determines a preferred target host to respond to the user's requests, the initial host communicates with a terminal or gateway node the target host's address, and the terminal or gateway node makes a connection wth the target host. Once the terminal or gateway node is in communication with the target host, the initial host forwards through the terminal or gateway node user profile information to the target host. The initial host is then disconnected and communication then proceeds with the user in contact with the target host through the terminal or gateway node. The entire process may take less than a second or two and the user may never know that a call deflection to a new host has occurred.

15 Claims, 12 Drawing Sheets

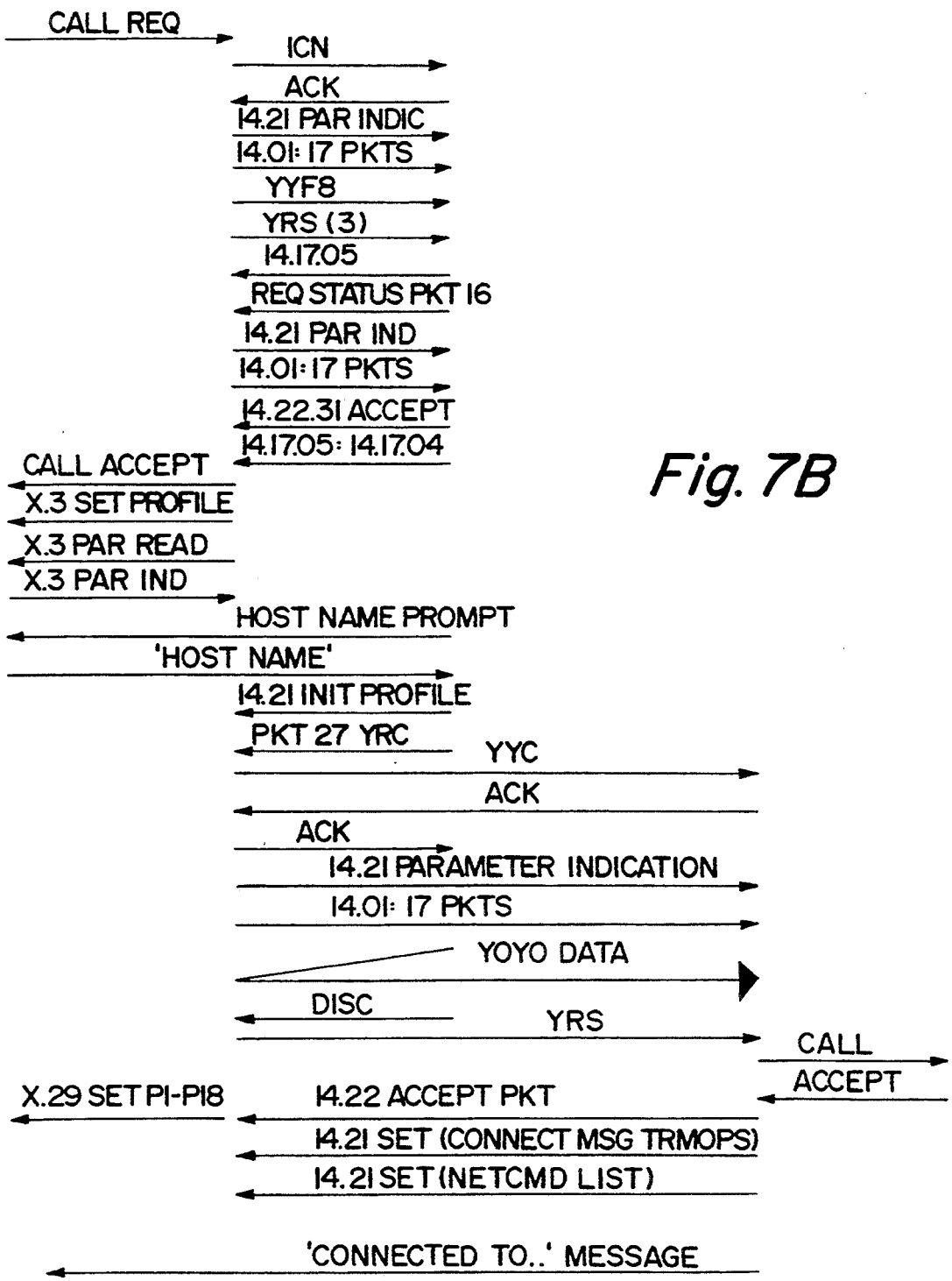

DATA TRANSMISSION ROUTING SYSTEM

BACKGROUND AND SUMMARY OF THE INVENTION

This invention relates generally to a computer system for use between a data terminating user and a multitude of data terminating hosts. More particularly, the present invention relates to a system for enabling a first data terminating host to inform a digital communications network of a desired transfer to a second host whereby the network conveys requests to a node which initiates a concurrent virtual connection to the second host.

It has been known for some time that a user may connect his computer terminal via a modem to a host computer at a remote location from the user. The modem facilitates a call over telephone lines to the host computer. The user terminal and the host computer can be in communication, or "on-line", by the phone call connection. A connection to a host computer may be desirable for several reasons. For example, the host computer may have substantially enhanced computing capability compared to that of the user terminal. The user terminal may be a small computer in itself capable of performing some computations. Or, the user terminal may be a "dumb terminal" which relies solely on a host for all of its computing. Besides offering enhanced computing capability, the host may have data storage capacity needed by the user. The host may also offer special services otherwise not available to the user, such as, up-to-the-minute weather forecasts, news service, or stock market reports.

Digital communications networks have been used to access remote hosts with local telephone access. Communications processors, called nodes, are located for user convenience. When users call modems on these local nodes, they are asked what remote host they need to be connected to. The network facilitates the virtual connection to a node adjacent to the desired host and then to the remote host itself.

Today, some companies such as CompuServe ® Incorporated offer their subscribers a multihost system. Several host computers are available to perform various tasks for terminal users. Prior to the subject invention, a user would have to make a call through his modem or communications network to access each host. Besides the inconvenience of requiring the users to learn the phone numbers or host addresses for each host, and what hosts provide what services, this process was also inefficient because it required the user to manually initiate a new connection to access a different host.

By using the present invention, any host within a network may redirect a user to another host as deemed necessary without requiring user involvement to initiate a second call. In other words, the user will gain from the efficiency of making one connection to the host and having the multihost system determine the appropriate host computer for the user to be in communication with at any given time. The multihost system, while in communication with the user, will respond by transferring computing responsibility from one host to another as the user's profile and requests indicate. The user will not necessarily know that his call has been deflected to another host. One initiated connection is all that is needed to let the multihost system decide which host is most suited to handling the user's needs. To summarize, the present invention provides a means of transferring a connection made between a data terminating user and a first data terminating host to a second data terminating host. The first and second virtual connections are routed over the optimal path in a distributed digital communications network. The first host informs the network of the desired transfer and the desired second host's address. The first host conveys the request to a node in the network in communication with the user (the "PAD"). The PAD initiates a concurrent virtual connection to a second host. When the PAD is informed that the second connection is successful, the PAD conveys success to the first host.

At the same time, the PAD also sends the second host operating parameters of the user. The first host may then send arbitrary amounts of information to the PAD to be forwarded to the second host. At the conclusion of this "announcement", the first host sends a disconnect to the PAD which responds by completing the transfer of the virtual circuit. The PAD is referred to as a TR node or a gateway node depending upon whether the user is a regular subscriber to the host's network or external to the network. When the user is an "on-line" regular customer of the multihost network, the user's modem accesses the network's TR node. Furthermore, the present invention allows external networks to access call deflection. When an external network accesses the multihost network of the present invention, the external network will pass through a gateway node.

The present invention offers several advantages over previously known systems of user-to-host communication. Using the present invention, a user terminal, making one call through a modem, can access numerous hosts having different addresses. Previously, it has been common for the user terminal to hang up on the first host and dial a new phone number to reach a second host. Or, in other previous systems where one host is in network with a second host, the user could access the second host without hanging up on the first host but the first host had to remain part of the connection. If the first host were to drop out, the connection to the second host would terminate. In other words, the first host acts as a switchboard in this known arrangement. Networks that route connections by relaying them through intermediate hosts waste both valuable host and node computer resources. Freeing the first host to process more data for customers, for example, allows the first host more availability for its intended function. Although the present invention incorporates the first host, it allows the first host to be disconnected after connection is made to a second host, without requiring the user to make a second phone call. Further objects and advantages of the present invention will become more apparent when viewed in light of the accompanying drawings and the following detailed description.

BRIEF DESCRIPTION OF THE DRAWINGS

FIG. 7B shows a connection diagram illustrating the steps of a call deflection from an external network user through a CompuServe ® host to a target foreign host wherein the external network user previously knows its intended target foreign host with the CompuServe ® host reverting to ask the user of its intended target prior to initiating the call deflection.

DESCRIPTION OF PREFERRED EMBODIMENT(S)

Figure 1A:
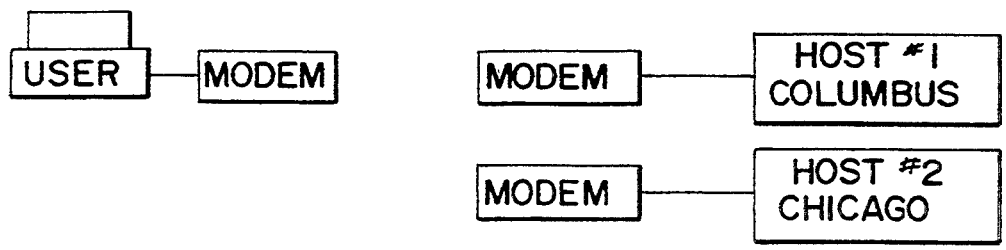
FIG. 1 is a schematic representation of a prior art system for getting a user from one host to another, shown in a series of four steps in FIGS. 1A, 1B, 1C, 1D.

Referring now to the drawings, and particularly FIGS. 1A through 1D, there is illustrated by schematic representation, one known method for a terminal user to connect from one host to a second host. In FIG. 1A, there is shown a computer terminal with a modem as is commonly known. The terminal could be a "dumb terminal", a personal computer terminal, or other such as a point of sale modem minus the screen and keyboard usually associated with a terminal. On the right side of FIG. 1A is shown two hosts with modems attached to each. Since the present invention was developed by CompuServe ® employees, many examples within this specification pertain to CompuServe ®. However, the present invention will function on any network and the examples herein should not be construed to limit in any way the scope of this new invention. As is the case with CompuServe's network, as well as others, the first host has been identified as being located in one city, such as Columbus, while the second host is in another city, here identified as Chicago. Of course it will be recognized that the host could be in the same city or even in the same building or in cities other than mentioned herein. Today, companies having multihost networks such as CompuServe ®, may choose to dedicate a host to particular uses. In other words, one host may be exclusively for weather reports. Another host may be exclusively for storage purposes. While another host may offer only stock market reports. Computer companies owning multiple hosts may also have regular subscribing customers. Particular customers may be initially directed to a particular host for all incoming calls made by the customer.

Figure 1B:
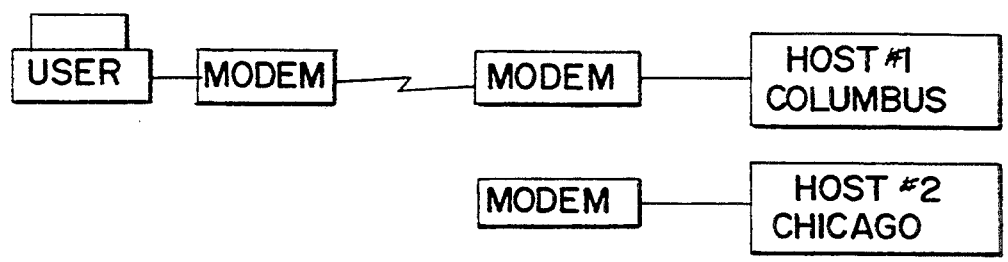
Figure 1C:
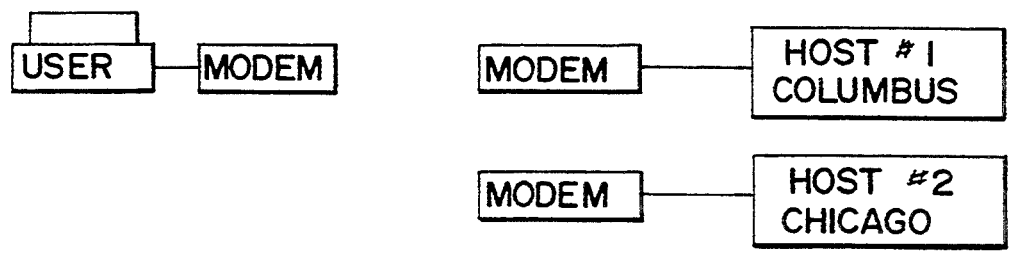
Figure 1D:
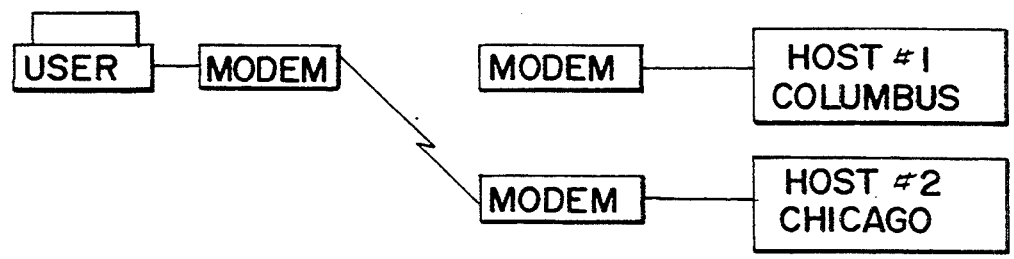

FIG. 1B shows a terminal user accessing a first host through their respective modems. Typically, this is accomplished by the user's modem dialing a phone number assigned to the first host. When the first host modem answers the phone call, the connection is made and the user is considered to be "on-line". It is at this point that the user typically begins to pay for the services provided by the host computer. If the user needs a service not offered by the first host but is offered by a second host, one known way for accessing the second host is for the user to "hang up" or otherwise terminate its connection to the first host. This is shown in FIG. 1C. The user can then call the phone number or address of the second host and a connection is made as shown in FIG. 1D. A major drawback of the known process shown in FIGS. 1A-1D is the time required to terminate the first connection and make a second call to a second host. At the very least, this could take several seconds and could, in fact, take many minutes or even longer if the phone number of the second host cannot be readily ascertained.

Figure 2A:
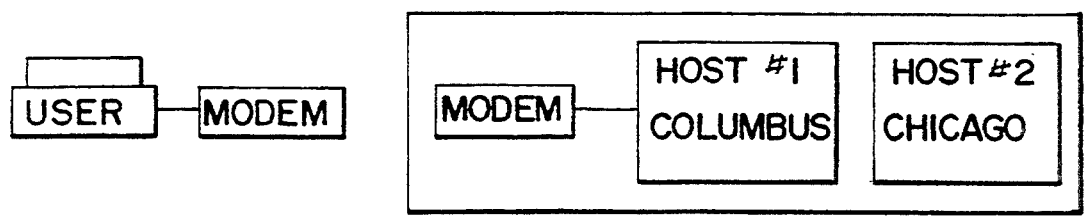
FIG. 2 is a schematic representation of another prior art system for a terminal user to get from one host to another as portrayed in the steps of FIGS. 2A, 2B, 2C.
Figure 2B:
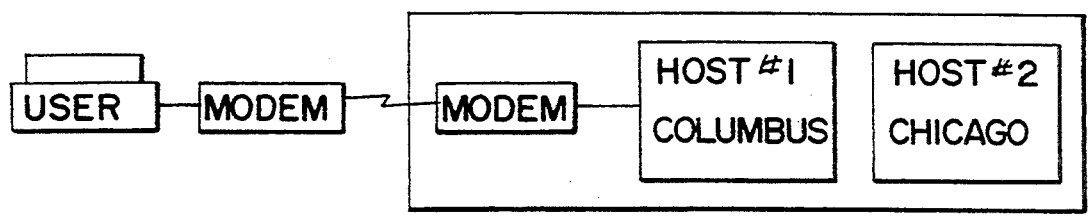
Figure 2C:
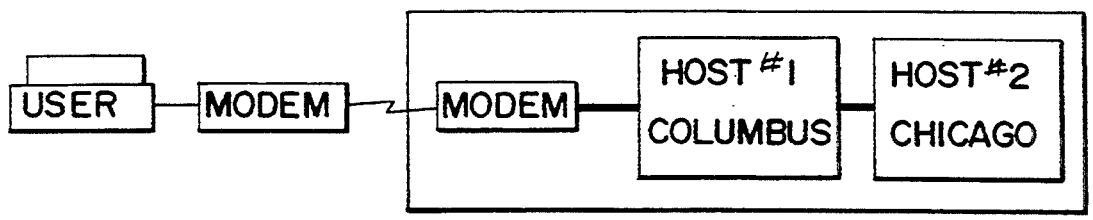

A second known process for a user to access a second host within a network is shown in FIGS. 2A-2C. In FIG. 2A, first and second hosts are shown within the same network such that the first host knows the second host and can make contact with the second host if requested. In FIG. 2B, the terminal user has called the first host and the connection has been made. In FIG. 2C, the first host has contacted the second host to better serve the user's needs, however, the first host remains in the loop. If the connection between the user and the first host is broken, the second host is also terminated. The first host is analogous in this instance to a telephone switchboard. A portion of the capacity of the first host is always in use as long as the second host is in contact with the user. This is an inefficient use of the first host. It would be preferable to maintain the connection from the user to the second host while disconnecting the first host from the user.

Figure 3A:
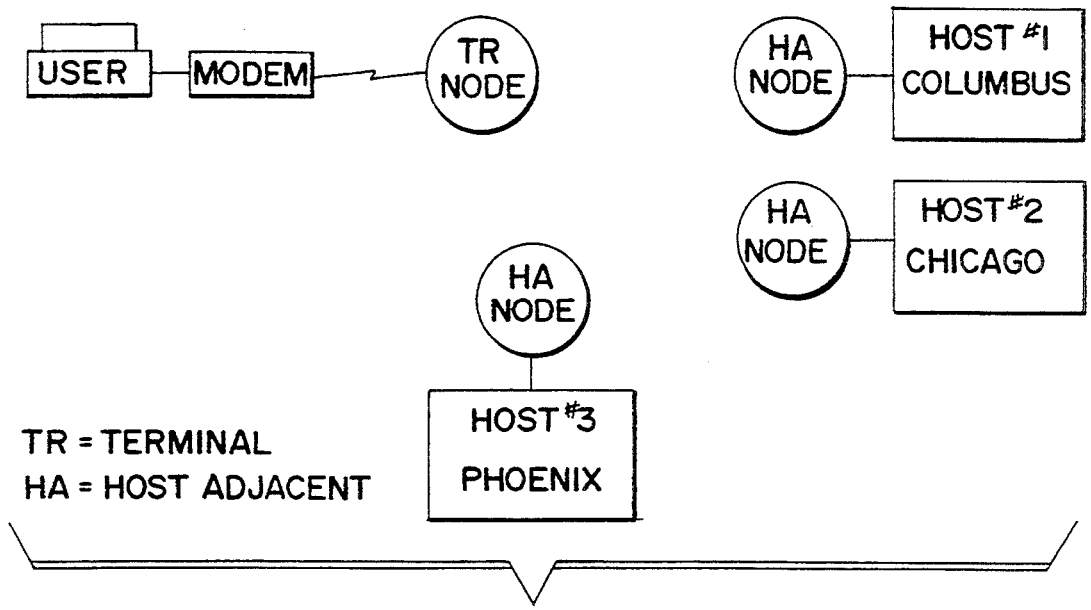
FIG. 3A shows the first step in one embodiment of the present invention for a terminal user to access a multihost system.

Referring now to FIG. 3A, one embodiment of the present invention is shown. A terminal user with a modem is shown with a three-host network. The terminal user is shown already in contact with a TR node which will be described in greater detail hereinafter. Each host is shown in association with an HA node which will also be described in greater detail hereinafter. For the moment, it is sufficient to know that the TR and HA nodes are terminal and host adjacent nodes respectively, and that each have their own computing capability with modems and associated programs for facilitating the present invention. One preferred hardware for the TR and HA nodes is a DEC PDP11 processor. It will be recognized that other hardware environments and other node hardware could be used for the present invention. The specific hardware herein mentioned is only for the purpose of providing an example of known hardware within which the present invention operates.

Figure 3B:
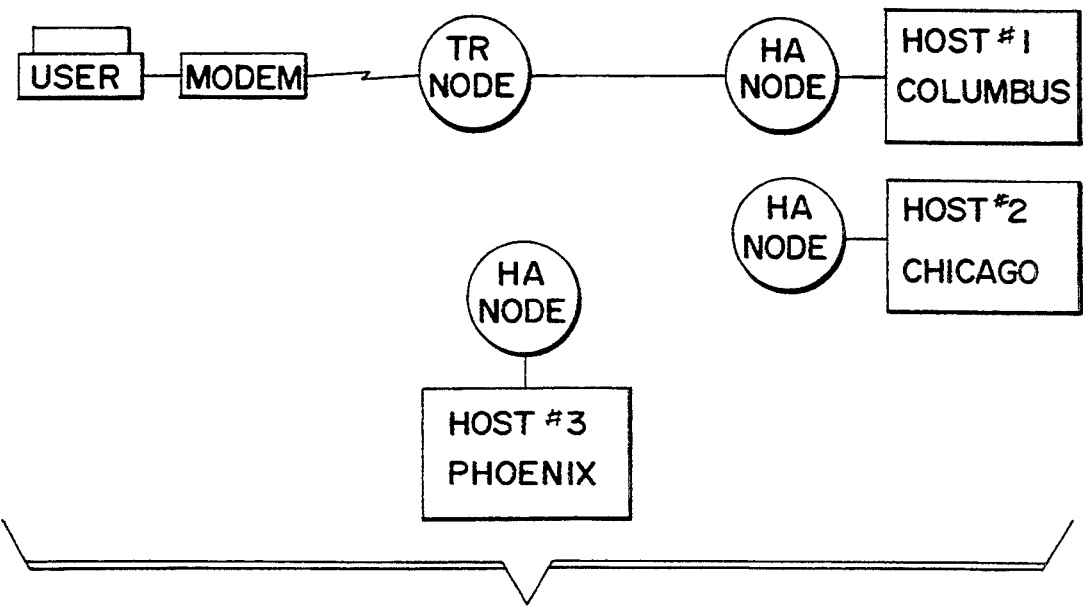
FIG. 3B shows the second step in the terminal user's connection to the multihost system of FIG. 3A.
Figure 3C:
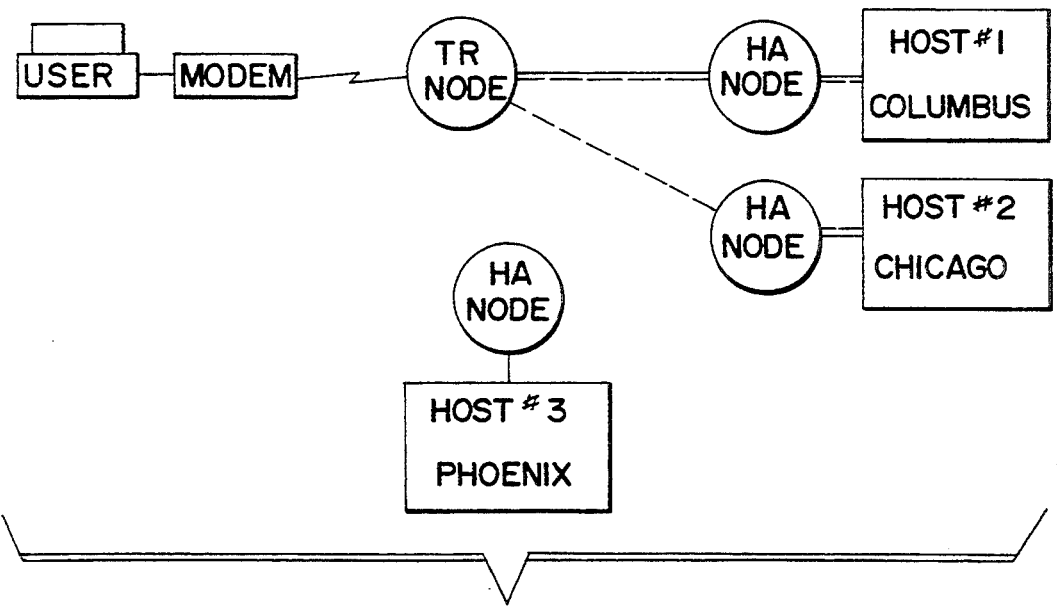
FIG. 3C shows the initial deflection of information from a first host to a second host as continued from FIG. 3B.
Figure 3D:
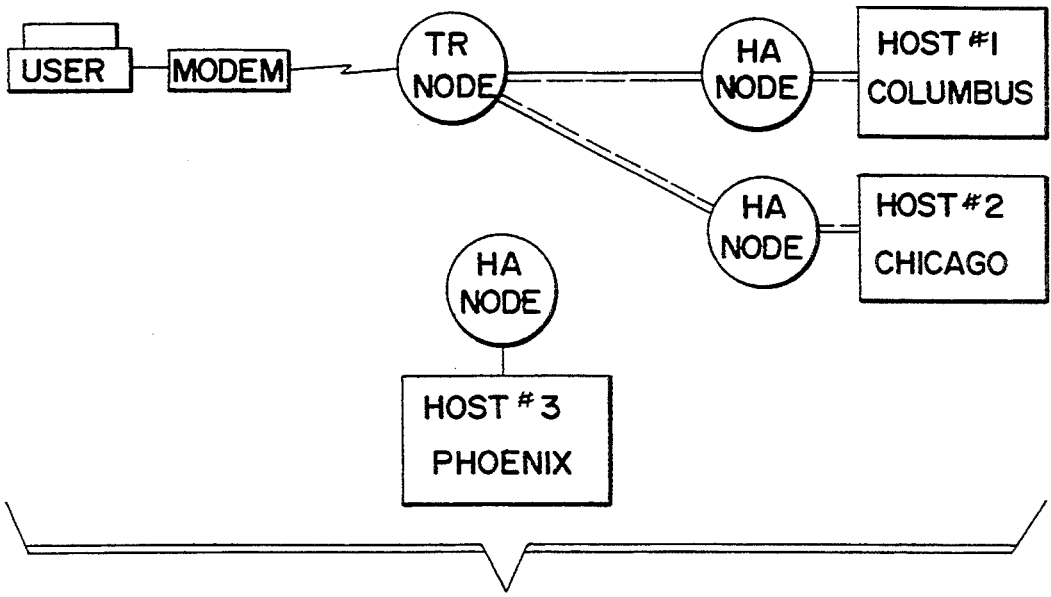
FIG. 3D shows the step of the second host acknowledging the communication link established in FIG. 3C.

In FIG. 3B, the terminal user has accessed the first host in much the same way as the user typically accesses a host except that most likely unknown 'to the user, his call has been routed through a TR node and an HA node prior to arriving at the first host. The first host identifies the user and determines by way of a program within the first host and, based upon information supplied by the user, which host should service the user's request. In FIG. 3C, the first host has determined that a second host is best suited in this particular instance to respond to the user's needs and it communicates this message back to the TR node. The TR node then initiates contact with the second host. The user may have no indication that this sequence of events is unfolding. In FIG. 3D, the second host has acknowledged the communication from the TR node and has established a two-way path for sending and receiving information from the TR node. It is important to momentarily have the first and second hosts in communication with each other through the TR node to provide another benefit of the present invention. With the present invention, the first host can transfer a user profile to the second host through the TR node. When the user and first host are in communication as shown in FIG. 3B, the first host can gather information about the user, such as, the selected service, the user's terminal type, whether the user has a color or monochrome screen, the character display width, the color environment, etc. In FIG. 3D, the user information or profile can be relayed to the second host without the second host having to get this information directly from the user.

Figure 3E:
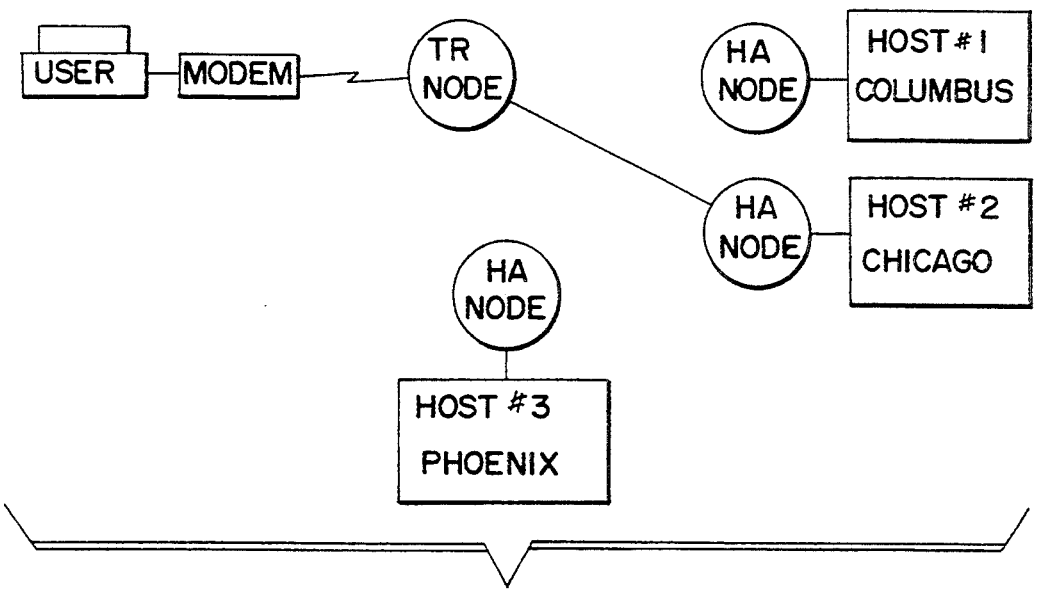
FIG. 3E shows the first completed call deflection, wherein the second host is in communication with the terminal user while the first host has been disconnected.

In FIG. 3E, the virtual connection with the second host is complete and the second host is now in sole communication with the TR node and the first host has been disconnected. One complete call deflection or "yoyo" has now occurred and the user is communicating with a second host, possibly without even knowing that the call was deflected. With the present invention, using high speed technology known today, the time to complete the steps as shown beginning in FIG. 3B and completed in FIG. 3E may be no more than one second.

Figure 3F:
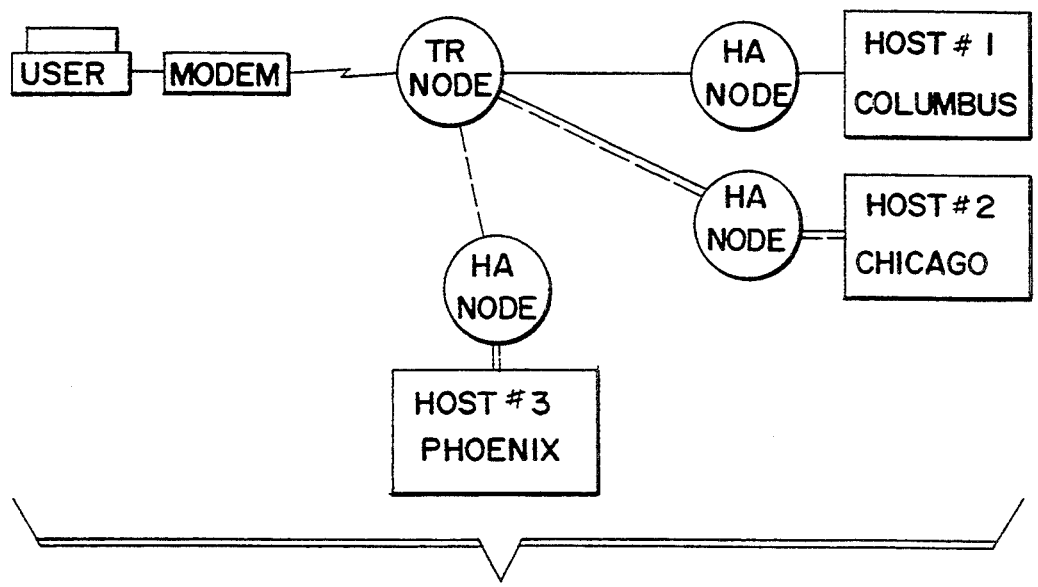
FIG. 3F shows the beginning of a second call deflection to a third host.
Figure 3G:
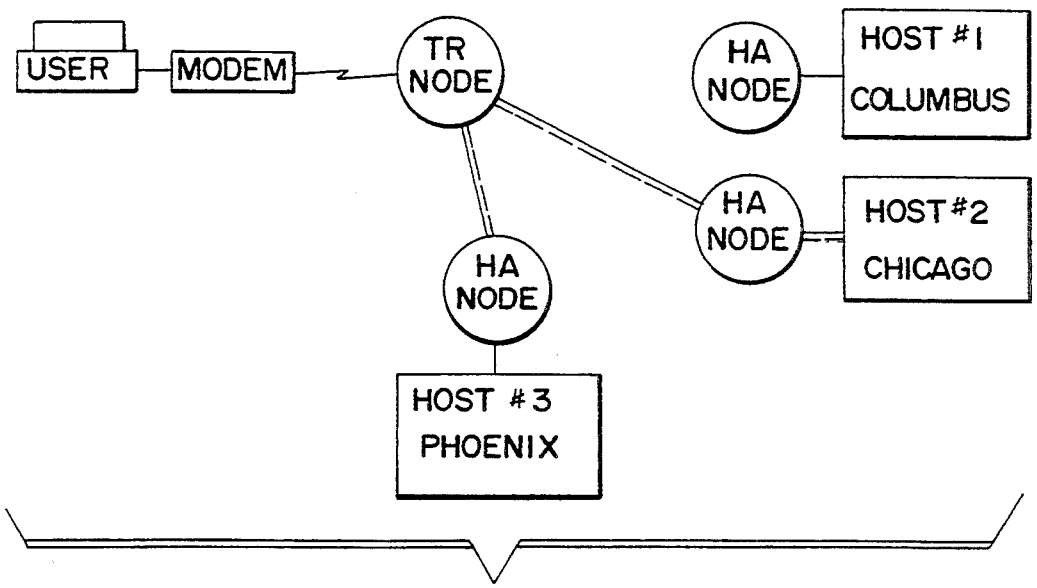
FIG. 3G shows the third host acknowledging the connection established in FIG. 3F.
Figure 3H:
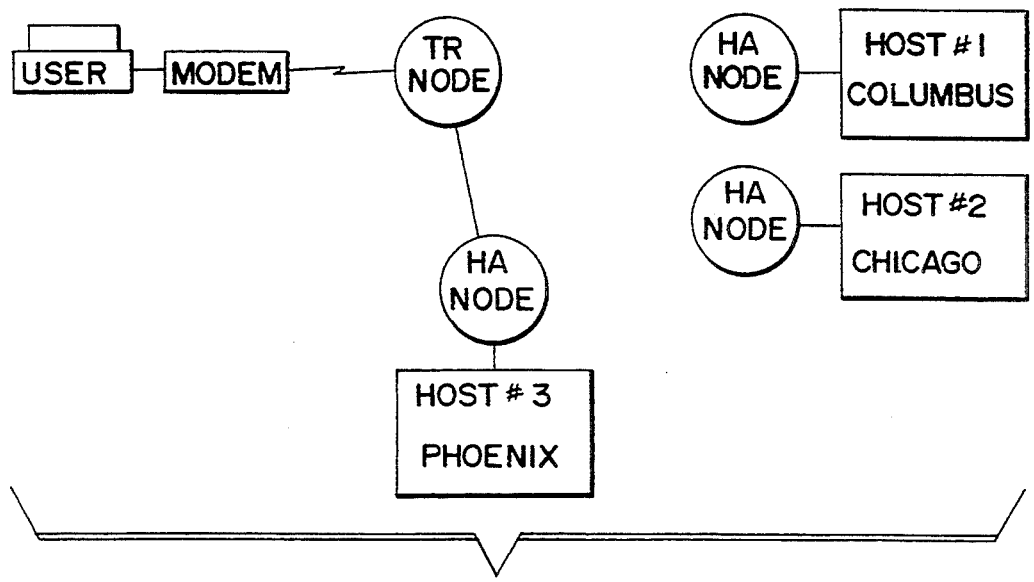
FIG. 3H shows the completed second call deflection, wherein the third host is in communication with the terminal user while the second host has been disconnected.

During the user's on-line session with the second host, the user may make a request which the second host determines would be better served by yet another host (or possibly only served by another host). As shown in FIG. 3F, the second host may initiate a second call deflection. Again, this information is conveyed to the TR node and the TR node establishes communication with a third host. In FIG. 3G, the third host acknowledges to the TR node the initiation of a call deflection. The third host can then get the necessary information from the second host through the TR node about the user. In FIG. 3H, the call deflection has been completed and the user is in direct communication with the third host. Once again, the user may never know that several call deflections have occurred.

Figure 3I:
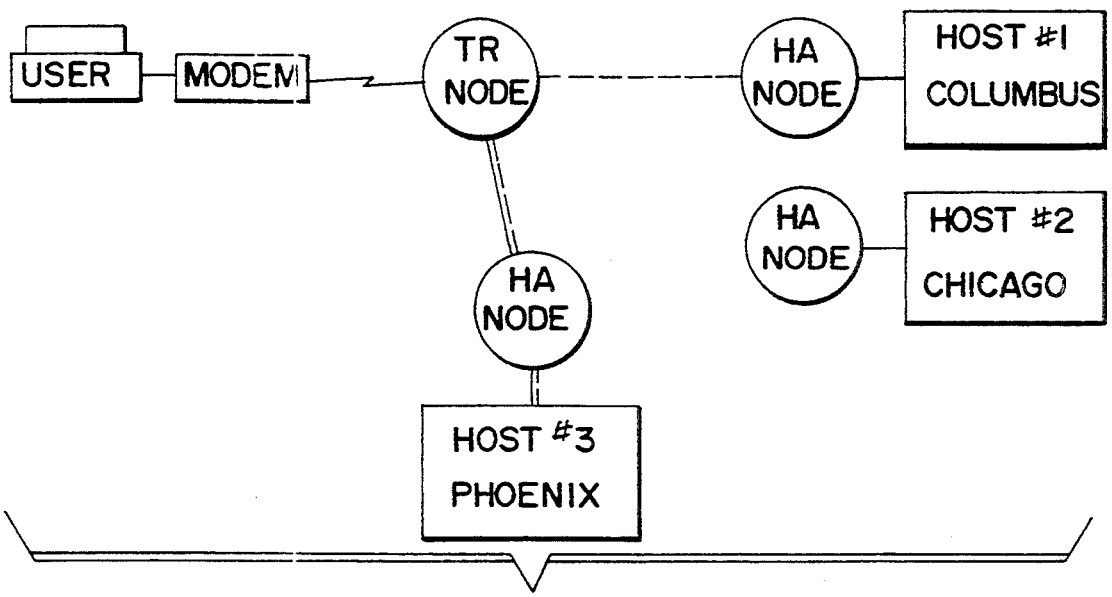
FIG. 3I shows a third call deflection to return the terminal user to the first host.
Figure 3J:
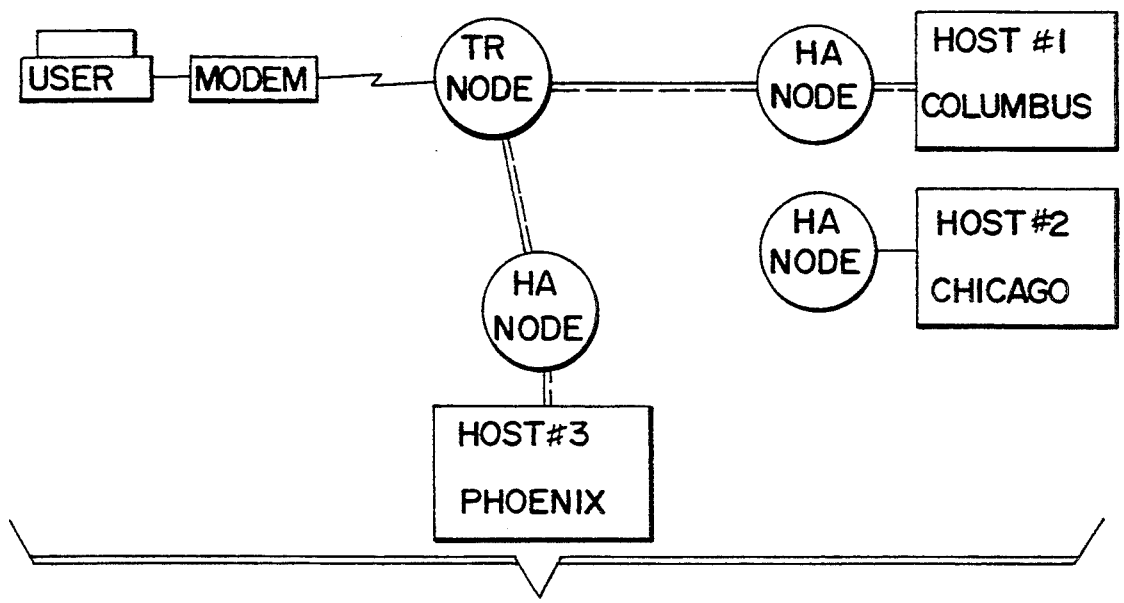
FIG. 3J shows the first host acknowledging the deflection shown beginning in FIG. 3I.
Figure 3K:
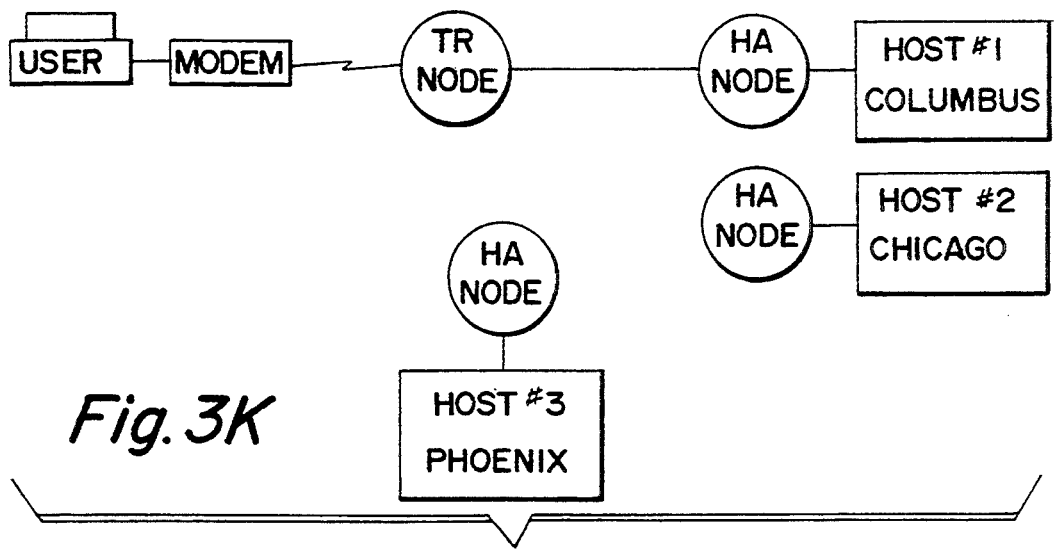
FIG. 3K shows the completed call deflection back to the first host.

In FIG. 3I, the process is shown by which the third host may return the user to the first host by the same call deflection process. With the present invention, each host may be provided with a program which works along with programs in the HA nodes and TR node to determine which host is best suited to serve the user based on the user's conveyed information and requests. FIG. 3J shows the acknowledgment of the call deflection by the first host from the third host. In Figure 3K, the second call deflection is complete and the user is returned to the first host. FIGS. 3A through 3K are provided as an example of the way in which the present invention works. The user does not have t! o be returned to the first host. The user's on-line session with the network could end with any host. The present invention may be used with all hosts in a network whether or not all of 'the hosts in the network are under the control of the same owner. The call deflection process described above was shown in a sequential manner from a first to a second to a third host for purposes of clarity. It should be recognized that in a multihost network the call deflection could occur from any host in the network to any other host within the network.

Figure 4:
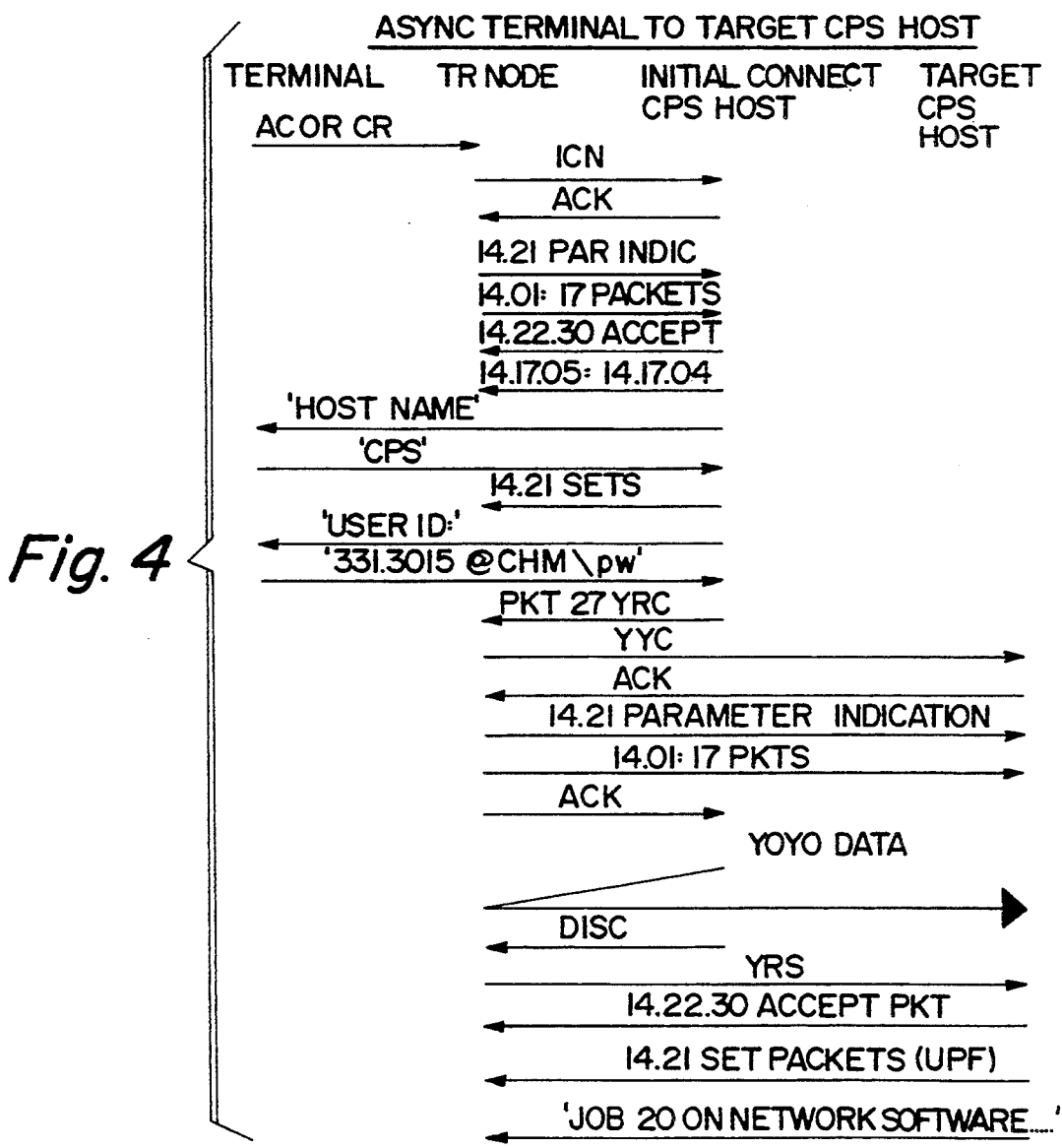
FIG. 4 shows a connection diagram illustrating the steps of call deflection occurring from a terminal user to a target CompuServe ® host.

Beginning with FIG. 4 and going through to FIG. 8, various timing diagram examples are shown which indicate the steps involved in the present invention as they occur chronologically. FIGS. 4–8 further illustrate different embodiments in which the present invention may operate. Each line within the timing diagrams are identified by a packet symbol which are in use by CompuServe ®. These symbols are only names to identify each packet being sent between nodes of the network and should not be interpreted to limit in any way the scope of the invention. The following table lists each packet name and its function:

|  | CompuServe ® Network Packets |
| --- | --- |
| ICN | Initial Connect |
|  | Contains code to specify desired initial host |
| ACK | Connect acknowledge |
|  | ICN or YYC "rang" and host "answered" |
|  | or YRQ succeeded |
| DISC | Disconnect |
|  | This network path between TR and Host no longer needed |
|  | Also indicates the end of data sent during Yoyos |
| YRC | Yoyo Request |
|  | Sent to TR to ask TR to create a path to a second host |
| YYF8 | Yoyo Function 8 |
|  | Used to send CALL REQ packet received from an X.25 network |
| YRS | Yoyo Reset |
|  | When sent to initial host that has requested YRC indicates TR could not establish path to target host |
|  | When sent to initial host after YYF8 packet(s) indicates end of CALL REQ packet data |
|  | When sent to target host indicates end of data send during Yoyo and |

-continued

| CompuServe ® Network Packets | |
|---|---|
| | initial host DISC |
| '...' | Data |
| Yoyo data | Most traffic over a network is carried in ordinary "data" packets |
| | Yoyo data and data to and from the terminal are shipped this way. |
| 14,01 | Tells host the modem/port class of the call |
| 14,17,4 | Set TR into login mode |
| 14,17,5 | Tell TR to reset parameters |
| 14,21 | Parameters |
| | (Parameters exist for such things as tabs, port speed, line widths, etc.) |
| | From TR: |
| | Parameter Indication |
| | Tells how TR has things setup for this terminal |
| | To TR: |
| | Parameter Set |
| | Tells TR how to change setup for this terminal |
| 14,22,n | Call Accepted by host type n |
| 17 | General terminal class information |
| X.25 Network Packets | |
| CALL REQ | Call Request |
| | Similar to ICN above |
| | Contains code to specify desired "host" |
| CALL ACCEPT | Call Accepted |
| | Similar to 14,22 |
| X.29 SET PAR | Set new profile of X.3 parameters |
| | Similar to 14,21 to TR |
| | (X.3 parameters are settings for such things as tabs, port speed, line width, etc.) |
| X.29 PAR READ | Request X.3 parameter values |
| X.29 PAR IND | Parameter indication |
| | As a response to X.29 PAR READ, tells the values of the requested parameters |
| X.25 Network with X.121 addressing | |
| CALL REQ | Call request |
| | Similar to CALL REQ above except contains code that specifies the desired "host" and additionally where to call. |

Referring now to FIG. 4, the connection diagram shows the sequence of communications between a terminal user, a TR node, an initial connect CompuServe ® host, and a target CompuServe ® host. The diagram begins with the terminal having already established communication with the TR node which typically may be accomplished by the modem of the terminal dialing a phone number of the TR node. The terminal user may then hit carriage return which directs the terminal node to connect with an initial host within the network. The initial host then acknowledges back to the TR node that a connection has been made. The TR node responds back to the initial host with parameter indication information which tells the initial host how the TR node has setup such parameters for the terminal user as tabs, port speed, line width, etc. Next the TR node informs the initial host of the modem and port class of the call and other general terminal class information. The initial host then communicates back to the TR node that the call has been accepted by the host type, which in this example is host type 30 of the CompuServe ® network. The initial host next tells the TR node to reset parameters and establish a log in mode at the TR node.

At this point in the connection diagram, the initial host asks the terminal user the desired host name. The terminal is now in direct communication with the initial host and replies with the desire host or service name. The initial host then communicates with the TR node, telling the TR node how to change the set up for this particular terminal user. The initial host then inquires of the terminal user of its user ID. The terminal user responds to the initial host sending back its user ID. Now the initial host has gathered sufficient information from the terminal user to determine where in the network the terminal user should be. The initial host makes the decision of which host to deflect the call to. The initial host then communicates back to the TR node with a yoyo request asking the TR node to create a path to a second host.

The initial host will provide the TR node with code for the new host. The TR node ten sends a packet of information to the selected second host and establishes communication therewith. It may be necessary to pass through other nodes to arrive at the target host. The target host acknowledges the connection with the TR node. The TR node essentially repeats the parameter messages to the target host about the user terminal. The TR node then communicates with the initial host, informing the initial hose that the target host has established communication with the TR node and has been informed of the terminal user's parameters. At this point, the TR node is ready to receive the yoyo data from the initial host to transport the data from the TR node to the target host.

The data stored in the initial host, that it has learned from the terminal user is now sent to the TR node and forwarded on to the target host. The terminal user is not required to repeat any of the information previously provided to the initial host. After the initial host has sent all of the yoyo data, the initial host will disconnect from the TR node and drop out of the circuit. At this time, the user, through the TR node, is in communication with the target host and the user may not know that a call deflection has occurred or that the initial host is no longer in the circuit. The TR node then informs the target host that all yoyo data has been sent and that the initial host has been disconnected. The target host responds to the-TR node that the call has been accepted and informs the TR node of the target host type. The target host also provides the TR node with parameters and a message to begin responding to the terminal user's requests.

Figure 5:
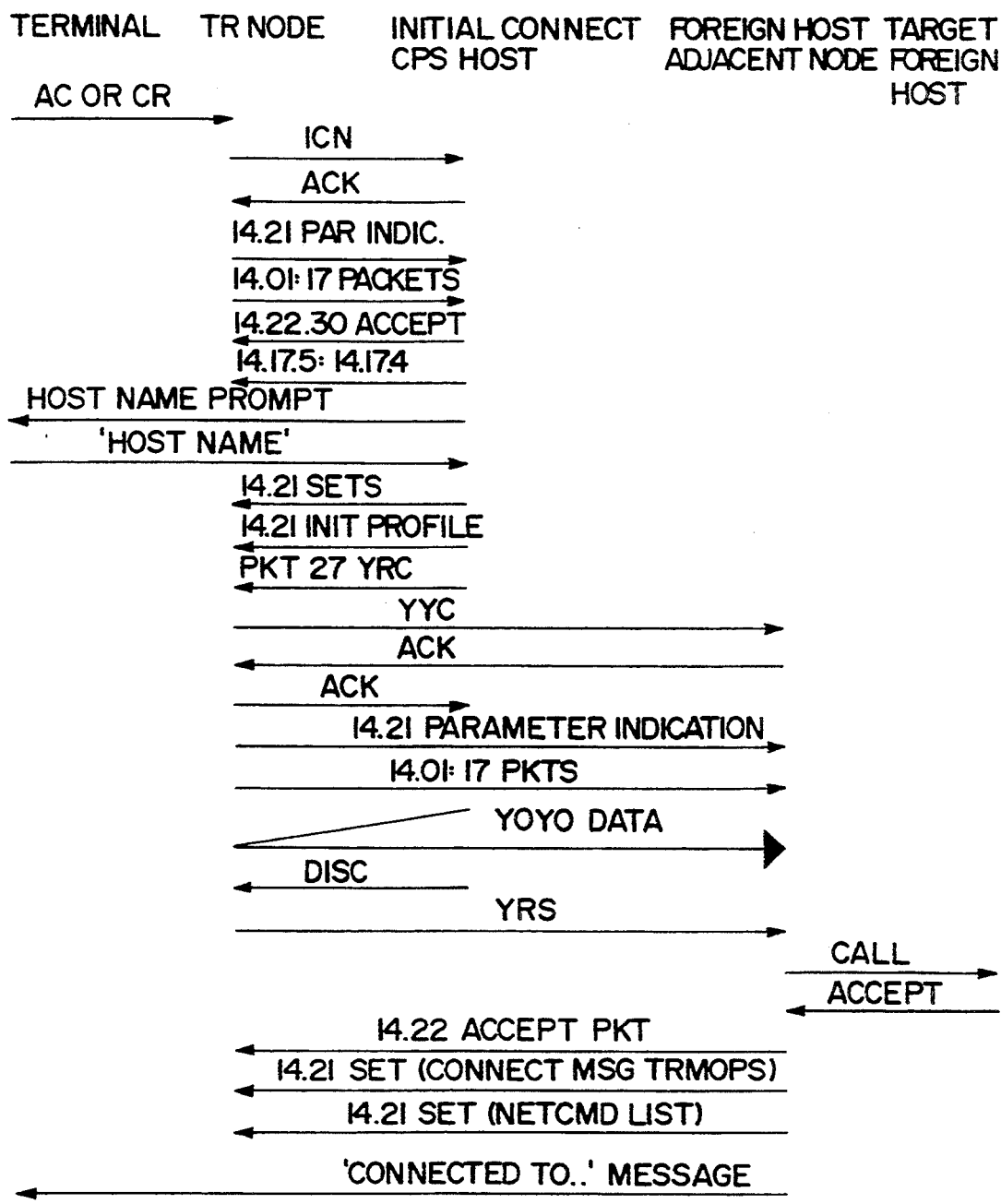
FIG. 5 shows a connection diagram illustrating the steps of call deflection from a terminal user through a CompuServe ® host to a target foreign host.

FIG. 5 is much the same as the connection diagram of FIG. 4, except the user terminal's call is deflected from an initial CompuServe ® host to a foreign target host which is in the CompuServe ® network but not owned or controlled by CompuServe ®. In this timing diagram, the initial host makes the determination from information provided by the terminal user, that a foreign host is best suited for responding to the terminal user's requests. The initial host deflects the call through the TR node to a foreign host adjacent node which is connected to the particular target foreign host.

Figure 6:
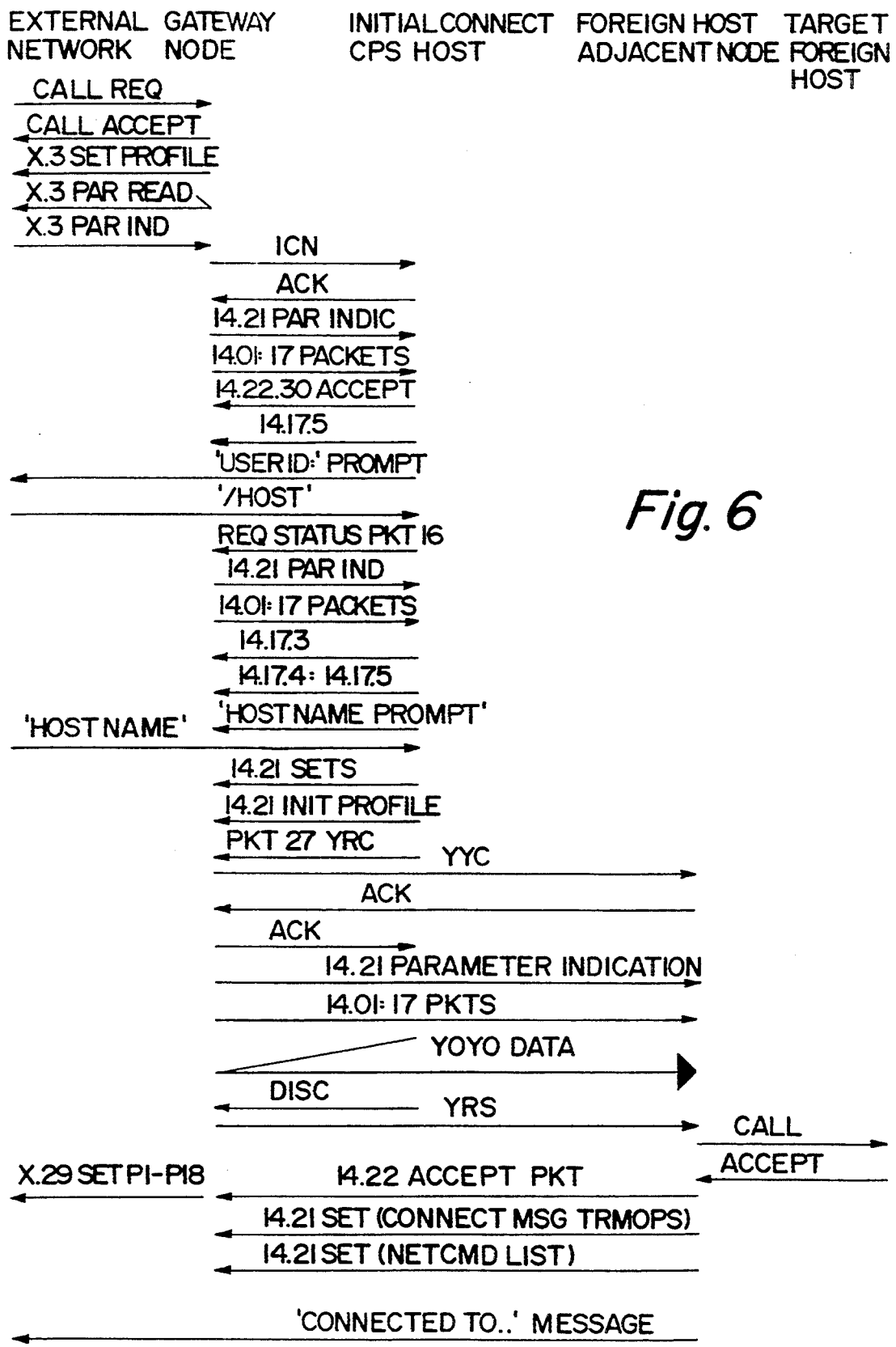
FIG. 6 shows a connection diagram illustrating the steps of call deflection from an external network user (outside CompuServe ® network) to a CompuServe ® host to ultimately arrive at a target foreign host.

FIG. 6 illustrates another connection diagram whereby an external network user may access the CompuServe ® initial host and be yoyoed to a target foreign host through a foreign host adjacent node. In this example, the external network user does not know the phone number or address of the target foreign host. The external network user communicates with the initial host and informs the initial host of the target host name. The initial host then activates the call deflection process of the present invention to ultimately put the external network user in contact with the target foreign host. In this timing diagram, the TR node has been replaced with what is known as a gateway node. The TR node and gateway node may be essentially the same with the difference being the gateway node is used in conjunction with external network users while the TR node is used in conjunction with the initial host network regular subscribers.

Figure 7A:
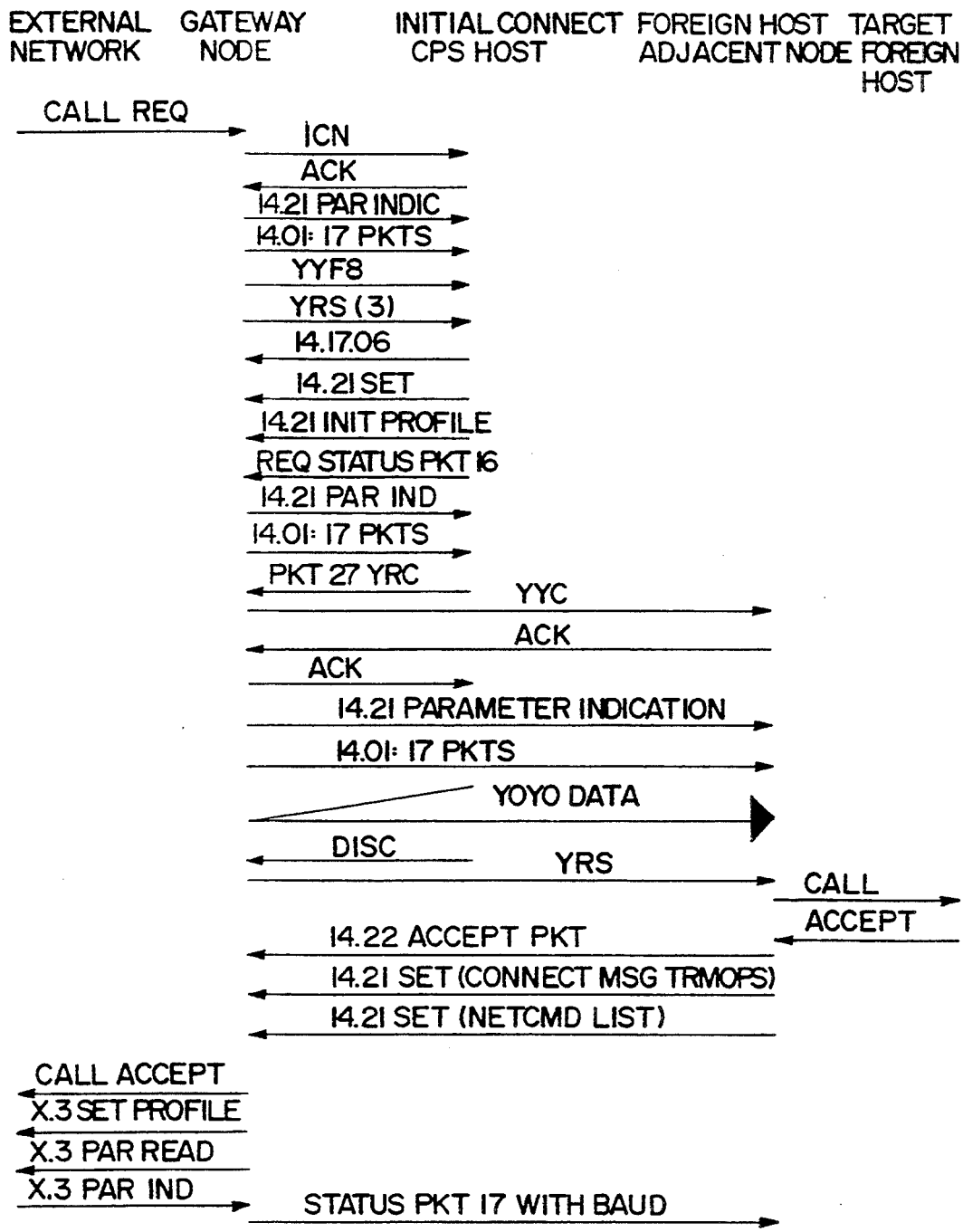
FIG. 7A shows a connection diagram illustrating the steps of a call deflection from an external network user through a CompuServe ® host to a target foreign host wherein the external network user previously knows its intended target foreign host.

FIG. 7A illustrates the steps involved in an external network user accessing a target foreign host by dialing the direct phone number of the target foreign host through an initial host network gateway node. In this example, the external network user may only be able to reach the target foreign host, even knowing the target foreign host's phone number, by entering the initial host network and being deflected to the target foreign host. In FIG. 7B, a slightly different example is shown whereby the external network user has the direct number of a target foreign host which is being accessed through an initial host network. In this example, the initial host double-checks the intended target host of the external network user by asking the external network user for the host name even though the external user has already provided the target host's phone number. This process may be helpful when the external network user has called the wrong number, when numbers and/or host's addresses have changed, or under other circumstances to verify the external network user's intended connection.

The information as conveyed from one node to another in the timing diagrams is packaged in packets. Each packet has an identifier and may contain several different types of information. There are packets of user information, set-up information, request and action, disconnect, etc. The yoyo connection ("YYC") and yoyo request ("YRC") contain the address of a target host which enables the TR node or gateway node to make the proper call deflection. Yoyo data packets which are passed to and from the initial connect host to the target host adjacent node during yoyo connections are contained within several yoyo data types. Each yoyo data type is comprised of a field which has a particular format and byte organization. Some types may include: UIC data for host connect messages; billing information; X.121 call request data; node identifier information; X.3 profile; inbound statistics; and a call redirection node list to attempt to reroute a call if a connection cannot be made at a particular target host node. These are just some examples of possible data types, but it should be appreciated that other data types used within the yoyo system would fall within the scope of the present invention.

The present invention has been explained above by discussing what it does (i.e.—call deflection), the way it functions within a network (i.e.—a call passing through a TR or gateway node to a first host adjacent node and on to the first host; the first host determining the best host in the network for responding to the user's request and conveying this target host's address to the TR or gateway node; the TR node contacting the target host; and, the initial host being disconnected from the TR or gateway node), and the steps involved as illustrated in the connection or timing diagrams. Further yoyo program module information will now be provided.

A yoyo program is provided to operate within the host network. The program in one preferred embodiment of the present invention is comprised of four program modules. Before any further explanation, it is important to note that one skilled in the art could develop a program for running yoyo within a network that is different from the program that is about to be described. The program described hereinafter is supplied as one working embodiment of the present invention but other programs accomplishing the same or similar objectives would fall within the scope of the present invention. The four modules within the yoyo program will be identified by the initials PK, TR, HF, and LM. The simplest of these four modules is the LM or "Link" module which links the other modules of the various nodes so that communication can occur between each node. Modules similar to the LM module are commonly known to one skilled in the art and several variations of the LM module would serve the intended purpose and need not be described in any greater depth herein. Each node within the network would contain one or more LM modules.

Each node in the network would contain one PK module or first program means. The principal function performed by PK is that of transferring data packets from one network node module to another node module in an orderly manner. Some of the functions of PK may be: the assembly of characters into packets of information; disassembly of the packets back to characters; assembly of packets into blocks to be transferred to other nodes in the network; disassemble packets from blocks received; provide special line-buffering functions; establish logical connections; transfer packets in a manner such that a node is not monopolized; forward data at a rate that it can be assimilated; and inform of the readiness of each destination to assimilate more packets.

There may be no peripherals used by PK so it is device independent.

PK may have several global routines that each perform particular functions. One such routine, PKCKPT checks to see if room is available to store a packet. PKBILD terminates any packet that might be initiated already and checks to see if it can start a packet in the space available. If so, it begins a packet of a particular type number and returns through PKCKPT logic.

PKPUTC checks to see if a packet has been started and returns if not. Otherwise, it then adds a data byte to a packet and returns through PKCKPT logic. CDPUTC checks to see if a packet has been started and if not, starts a data type packet. It then checks to see if the packet is full and if so, it starts a new one. It finishes its functions through PKPUTC logic.

PKRELS checks to see if a packet is started and if so, it finishes off the packet. It transfers the first packet on the source list to a destination list. The routine CEPUTC functions much 'the same way as the CDPUTC. Routine CEUNPT interacts with the TR module and checks to see if any characters have been entered via CEPUTC. If not, it returns accordingly. Otherwise, it also removes the last character from a packet and checks to see if the removed character has been echoed. CELNJK checks to see if entry of a line (via CEPUTC) has begun. If not, it returns immediately or else it removes all packets comprising the line from storage. CEFLSH scans the entire source storage for a calling port on a node and removes all data packets. CEGETC retrieves characters entered via CEPUTC for processing by TR's echo handlers. If a non-data packet is encountered, it automatically transfers the packet and all preceding data packets to a destination port. CEXMIT transfers all packets that have been fully echoed to their destination port. It also aims the echo pointer properly after transfer.

PKPUTH initiates a quick packet which is placed at the head of the source list. It attaches one data byte to the packet and closes the packet. It then transfers the packet to the destination port. PKPUTB is used with the LM modules to process a block one packet at a time into packets. It also calls XXFLAG routine for ports that are no longer exceeding their quota. For each packet, it attempts to enter the packet into storage. All packets entered into storage are released as though PKRELS were called. If insufficient space prohibits entry of a packet into storage, it returns with the block not fully disassembled.

CDGETC is a function of the TR or HF modules telling the PK module to get anything that has been received for a particular destination. It locates the first packet for a destination port and if there is none, it returns failure. If it finds a packet, it retrieves the next byte of the packet. If the byte retrieved was the last byte of the packet, it sets an end of packet flag. It then removes the packet from storage. PKJUNK determines if a packet has been partially retrieved and if not, returns immediately. If the packet has been accessed, it removes the packet from storage. PKGETB works with the LM module to scan a queue for packets that are forwardable. It then assembles onto a block as many packets as quotas and block space permit. If the queue is empty, it assembles short flag packets onto the block. It also frees up any packets that are forwarded from storage.

PKYOYO checks to see if yoyo is in progress and if not, returns immediately. If yoyo has started, it exchanges connections for the two lines; one to the new host and one to the previous host.

The following routine descriptions are for subroutines external to PK that are called by PK when action may be appropriate: XXWAKE is found in the TR, HF and LM modules and is called by PK whenever PK has transferred a packet to a destination for which no packet is already stored. The purpose of the call is to inform the destination of the existence of data. If the destination port desires, it may in turn call PKGETC and PKJUNK to read the packet(s). This is useful for processing of high priority packet types such as "KILL" packets or delaying processing of lower types until devices are ready.

XXHUNG is an external routine found in the TR, HF and LM modules which PK calls when packets for a destination have been in storage for a period 0f over a second without any calls to PKGETC (to read the packet). Otherwise, XXHUNG is identical to XXWAKE as far as how the Call is handled.

XXFLAG is another routine found in the TR, HF and LM modules which PK calls when a port enters a state such that it is ready to have packets put into its storage. Thus, a call to XXFLAG "flags" the port to tell it that the particular destination is ready to accept more data. The port may ignore the call, may set its own status to remember the state, or may in turn call any of the packet construction routines.

XXFFLG is a routine found in the LM module which PK may call when a port's available storage quota and space is increased by a packet being successfully forwarded. It may be called even if the port has not reached its quota. Links to other nodes use it to resume block building processes.

Blocks as used in this description are composed of individual packets prefixed with packet headers to carry status and size information between nodes. Each packet is preceded with its port number, a flag byte and a size byte. The flag byte has two functions: The sign bit, when set, indicates that an actual packet follows; the rest of the byte carries a count of successfully forwarded packets. The size byte is similarly composed of two fields: The sign bit, when set, indicates that the following byte is the type byte; when clear, the type is data (type O) and no type byte is necessary; the rest of the size byte is the number of bytes following (this includes the type byte).

Each TR node in the network would contain one TR module or second program means. The principal function performed by TR is that of assembling data characters from user port into data packets and disassembling data packets into characters and presenting them to the users. Other functions of TR are: the detection of ringing modem lines; answering modem calls; the detection of terminal rates; the construction of initial connect packets; the detection of disconnected modems; the initiation of sending of disconnect packets; and, all the yoyo processing herein.

Each foreign host adjacent node would contain one HF module or third program means. The principle function performed by HF is to convert between packet types used by a foreign host and those used by the digital communications network. Other functions of HF are: recognition of initial connect packets and initiation of the proper sequence to connect into the foreign host; detection of X.29 requests by the host and conversion of them into appropriate packets; and, handling of the target host end of the yoyo procedure.

Each host that is capable of redirecting calls would contain one COMLOG module or fourth program means. The principle function performed by COMLOG is to determine what host to redirect connections to and to perform the necessary actions to effect the yoyo from the first host. Other functions of COMLOG are: to interrogate the user of his identification and password; access a database for each host to determine its specifications; forward yoyo data on to next host; and, all the functions specified herein for the first host.

It is thought that thee data transmission routing system of the present invention and many of its attendant advantages will be understood from the foregoing description. It will be apparent that various changes may be made in the form and construction of the components thereof without departing from the spirit and scope of the invention or sacrificing all of its advantages. The form herein before described being merely a preferred or exemplary embodiment thereof.

What is claimed is:

1. A computer system in which a terminal user making a request for information or other assistance available through a computer network, accesses a first host within a multihost network, said system comprising:
   a PAD node within the network to receive a call from the terminal user and connect the user to the first host; first program means within the first host for processing profile information from the user and selecting which host within the multihost network should handle the user's request; and second program means within the PAD node for responding to the first host and contacting a selected target host independent of user instruction, wherein after a connection is made with the target host the terminal user's connection with the first host is deflected to the target host.

2. The computer system of claim 1, further comprising: at least one host adjacent node connected to each host in the network, to receive communications from the PAD node and convey said communications to its respective host; and third program means within the host adjacent nodes for interaction with the first program means within each host and the second program means within the PAD node.

3. The computer system of claim 1, wherein the first program means is capable of disconnecting the first host from the PAD node after the user has been deflected to the target host.

4. The computer system of claim 1, further comprising: means associated with the first program means and the second program means to transfer the user profile information to the target host independent of user instruction.

5. The computer system of claim 1, further comprising: the first program means also within the target host to enable the target host to deflect the user to a second target host.

6. The computer system of claim 1, wherein the terminal user is a regular subscriber to the multihost network.

7. The computer system of claim 1, wherein the terminal user is external to the multihost network.

8. The system of claim 1, wherein the target host is a foreign host outside the control of the first host owner but within the network.

9. The system of claim 1, wherein the first host and the target host are in separate cities.

10. A method for switching a terminal user, making a request, from one computer host to another computer host within a multihost network, said method comprising the steps of:
    the terminal user calling a first host within the network, the call being received through a PAD node which contacts the first host, such that the user, the PAD node, and the first host are simultaneously in communication; the first host learning profile information about the user and the user's request; the first host determining a target host within the network that should respond to the user's request and informing the PAD node of the target host address; the PAD node contacting the target host; and the first host disconnecting from the PAD node.

11. The method of claim 10, further comprising the step of: the first host sharing information about the user with the target host prior to the first host disconnecting.

12. The method of claim 10, further comprising the step of: the target host deflecting the user's call to a second target host.

13. The method of claim 10, wherein the terminal user knows the desired target host.

14. The method of claim 10, wherein the terminal user does not know the target host.

15. The method of claim 10, wherein the user is unaware that the user's call to the first host has been deflected to the target host.

* * * * *

UNITED STATES PATENT AND TRADEMARK OFFICE
CERTIFICATE OF CORRECTION

PATENT NO. : 5,426,427
DATED : June 20, 1995
INVENTOR(S) : Douglas Chimnock et al It is certified that error appears in the above-indentified patent and that said Letters Patent is hereby corrected as shown below:

In column 5, line 5, please delete the word " 'to" and replace it with "to".

In column 6, line 24, please delete the word "t! o" and replace it with "to".

In column 6, line 28, please delete the word " 'the" and replace it with "the".

In column 11, line 20, please delete the word "'the" and replace it with "the".

In column 12, line 17, please delete the word "0f" and replace it with "of".

In column 12, line 20, please delete the word "Call" and replace it with "call".

Signed and Sealed this

Fifth Day of September, 1995

*Attest:*

BRUCE LEHMAN

*Attesting Officer*  *Commissioner of Patents and Trademarks*